(12) United States Patent
Ienaga (10) Patent No.: US 6,275,923 B1
(45) Date of Patent: *Aug. 14, 2001

(54) DATA PROCESSING METHOD AND APPARATUS

(75) Inventor: Takashi Ienaga, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,228

(22) Filed: Jun. 26, 1997

(30) Foreign Application Priority Data

Jun. 28, 1996 (JP) .................................. 8-168948

(51) Int. Cl.$^7$ ...................................... G06F 15/00
(52) U.S. Cl. ............................... 712/37; 710/8
(58) Field of Search ............... 395/800.32, 800.33, 395/800.36, 800.37, 800.38, 712, 182.01–182.05, 182.07, 827, 828, 842, 568; 711/103; 712/32, 33, 36, 37, 38, 227; 714/3–7, 9; 710/7, 8, 22

(56) References Cited

U.S. PATENT DOCUMENTS

| | | | |
|---|---|---|---|
| 5,283,883 | * | 2/1994 | Mishler ................................. 395/853 |
| 5,454,100 | * | 9/1995 | Sagane ..................................... 714/8 |
| 5,701,506 | * | 12/1997 | Hosotani ........................... 395/800.37 |

FOREIGN PATENT DOCUMENTS

| | | |
|---|---|---|
| 62-139064 | 6/1987 | (JP) . |
| 3-11899 | 1/1991 | (JP) . |
| 4-309139 | 10/1992 | (JP) . |
| 6-139066 | 5/1994 | (JP) . |
| 7-311731 | 11/1995 | (JP) . |

OTHER PUBLICATIONS

Hamacher et al., *Computer Organization, Third Edition,* McGraw Hill Inc., 1990, p. 329.*

* cited by examiner

*Primary Examiner*—John A. Follansbee
(74) *Attorney, Agent, or Firm*—Sughrue, Mion, Zinn, Macpeak & Seas, PLLC

(57) ABSTRACT

A data processing apparatus and a data processing method for implementing data-tuning rapidly, in which when CPU is operating based on PROM data, it permits operation to implement while referring to data which is rewritten to RAM without stop of the operation. There is provided a CPU core for performing program operation for the purpose of implementing of data processing, a PROM for storing data which is referred at the time of data processing, a register for memorizing a data-stored-address, and a comparator for comparing an address. The comparator is brought into effective when the data-stored-address is outputted while rewriting the RAM during executing the CPU core, comparing the data-stored-address memorized within the register with an address outputted from the CPU core, bringing the RAM selection signal into active when both correspond with each other, while bringing the PROM selection signal into inactive, after receiving thereof the CPU core refers to the data stored within the RAM instead of the data stored within the non-volatile memory, thereby a data-tuning is capable of being realized without stop of operation.

4 Claims, 11 Drawing Sheets

DATA PROCESSING METHOD AND APPARATUS

BACKGROUND OF THE INVENTION

The present invention relates to a data processing method and apparatus. More to particularly this invention relates to a data processing method and apparatus for use in engine control of an engine development.

1. Description of the Prior Art

Figure 1:
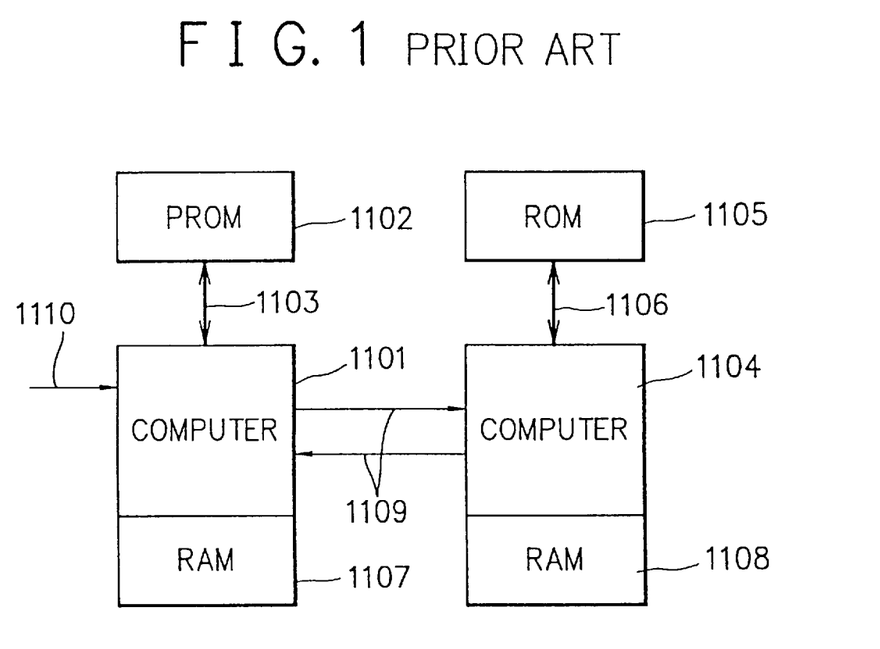
FIG. 1 is a block diagram showing one example of conventional data processing apparatus.

Formerly, for example, a multi computer system shown in Japanese Patent Application Laid Open SHO 62-139064 is used as a data processing apparatus of a computer. The data processing apparatus has the object that it eliminates complication or trouble on adaptive manipulation in response to various applicable examples. FIG. 1 is configuration view showing one example of the data processing apparatus. In FIG. 1, a free programmable read only memory (PROM) 1102 is allocated to the first computer 1101. Data exchange between the first computer 1101 and the free programmable read only memory 1102 is performed through a data path 1103. Read only memory 1105 is allocated on the second computer 1104. Data exchange between the second computer 1104 and the memory 1105 is performed through a data path 1106. The first computer 1101 has a write-read memory (random access memory) 1107. The second computer 1104 also a write-read memory 1108. Series data connection path (channel) 1109 is provided between the first computer 1101 and the second computer 1104. The first computer has a series input 1110.

In the apparatus of this constitution, it is capable of filing 16 pieces of different data sets fixedly into the read memory of the second computer 1104. The free programmable memory 1102 is accessed by the first computer 1101. The following memory cells are provided for the free programmable memory 1102. In case of constitution for computer system arrangement, a memory cell into which numbers of data-set intended to use in the second computer 1104 based on the suitable input to the first computer 1101 is filed, is provided within the memory cells. The numbers of data-set are memorized fixedly until when new constitution of computer system arrangement is implemented to the programmable memory 1102. Starting time of program progression, for example, at the time of making of operating voltage, the first computer 1101 transmits the number of data-set to the second computer 1104 through the series connection path (channel) 1109 in each time it happens. The second computer 1104 memorizes the number of data-set into its own write-read memory 1108 based thereon. When the second computer 1104 employs data from the read memory 1105, the second computer 1104 fetches the data from the numbers of data-set memorized on its own write-read memory 1108. Besides, when the operating power supply is off, and the computer system is off, the number filed in the write-read memory is disappeared. At the time of starting of the system, the data-set is newly memorized thereon.

Now, in the data processing apparatus for use in engine control of an engine development, work of tuning for confirming result while changing various control parameters is required in order to obtain required engine characteristics. When the above described apparatus is used as the data processing apparatus, it permits a data-set of control parameter to set to the read only memory 1105 beforehand. A control parameter is capable of being changed by virtue of a data-set number supplied from the programmable memory 1102 based on the suitable input to the first computer 1101 while setting data-set of the control parameter to the read only memory 1105 beforehand.

However, the number of data-set set in the read memory 1105 beforehand is confined, also number of the data-set number provided by the programmable memory 1102 is confined. There is required that it implements new program operation such as disconnection of both of operating power supply and the computer system, and change of read only memory 1105 into another one with different data-set, in order to implement tuning of control parameter which requires enormous numeric combination. Such trouble comes into one cause which lengthen development period of engine. There is requirement that change of control parameter is intended to perform in the condition that the engine remains operated to perform rapid tuning while shortening the development period.

SUMMARY OF THE INVENTION

In view of the foregoing, it is an object of the present invention to provide data processing method and apparatus which is capable of performing rapid tuning exception for disconnecting of operating power source or disconnecting of the computer system.

According to one aspect of the present invention, for achieving the above-mentioned object, there is provided a data processing apparatus having a CPU core for executing a program operation for the purpose of implementing data processing, a non-volatile memory storing data referred to at the time of data processing, a RAM for data tuning, a register for memorizing data-stored-address, and a comparator for comparing address, wherein when the data-stored-address is outputted while rewriting the RAM during execution the CPU core, the CPU core refers to data stored within the RAM instead of data stored within the non-volatile memory. Namely, the comparator is brought into effective when it permits the RAM to rewrite before the data-stored-address is memorized within the register, at the time when the comparator is brought into effective the comparator compares the data-stored-address memorized within register with an address outputted from the CPU core, when both correspond with each other, the comparator brings a RAM selection signal into active, and brings a PROM selection signal into inactive. Furthermore, in this case, two memory regions are established in the RAM, respective two registers and two comparators are provided corresponding to respective memory region, and the data-stored-address is memorized within corresponding register after corresponding memory region being rewritten, corresponding comparator is brought into effective.

According to another aspect of the present invention, a data processing method is executed in the data processing apparatus which comprises a CPU core for executing a program operation for the purpose of implementing data processing, a non-volatile memory storing data referred to at the time of data processing, a RAM for data tuning, a register for memorizing data-stored-address, and a comparator for comparing address, wherein it permits the program operation to execute referring to data stored within an address corresponding to the PROM based on address outputted from the CPU core, which executes program operation referring to the data stored within the RAM instead of the data stored within the non-volatile memory when the data-stored-address is outputted with the RAM rewritten during execution of the CPU core. Namely, the data processing method memorizes the data-stored-address into the register when the RAM is rewritten, bringing the comparator into effective when memorizing is implemented to the register, comparing an address outputted from the CPU core with the data-stored-address memorized within the register, reading a data stored within the RAM of the address when both addresses correspond with each other, and executing program operation while the CPU core referring to the data which is read out. Furthermore, in this case, two memory regions are established in the RAM, respective two registers and comparators corresponding to respective memory region are provided, and data of any one of the memory regions, the data-stored-address is memorized into corresponding register, and corresponding comparator is brought into effective.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail accompanying drawings.

Figure 2:
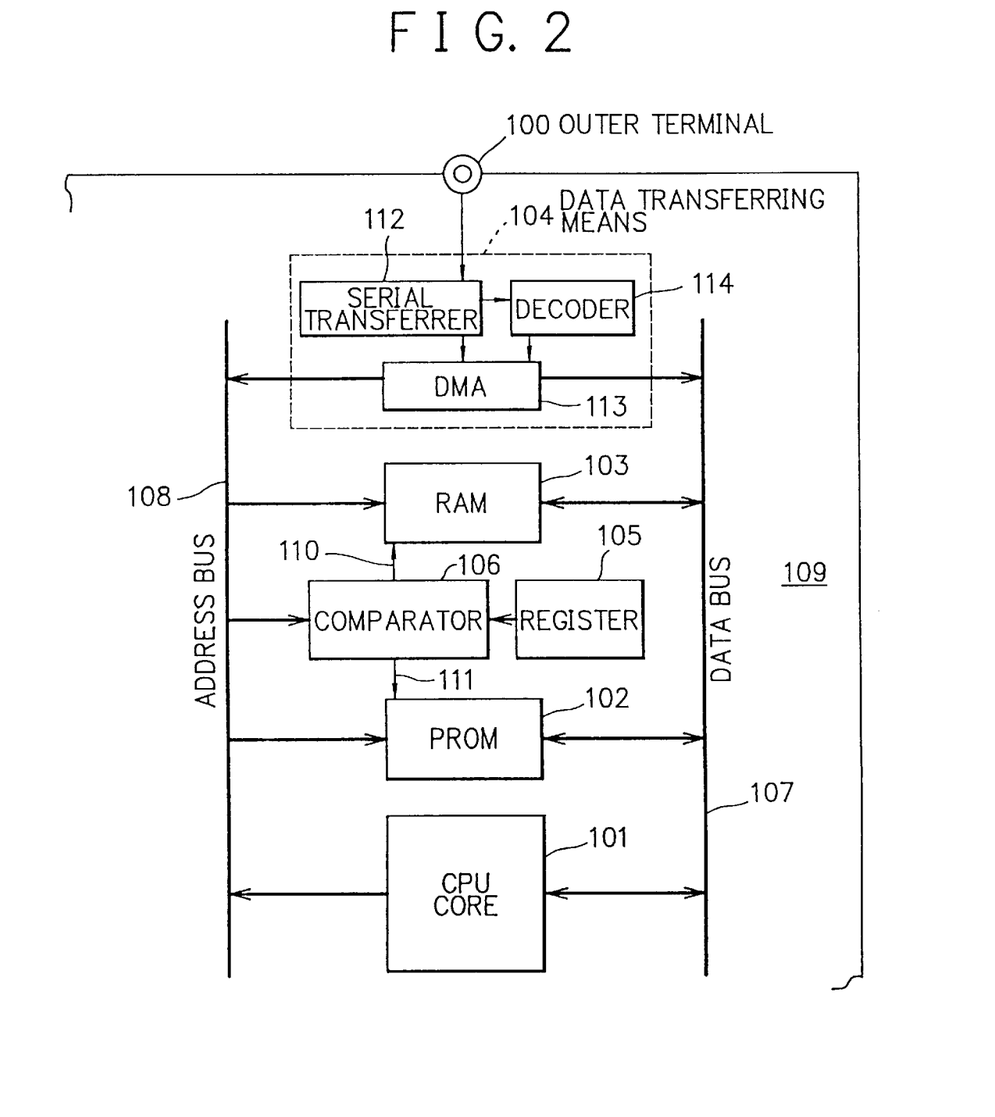
FIG. 2 is a block diagram showing a first embodiment of a data processing apparatus according to the present invention.

FIG. 2 is a block diagram showing the first embodiment of the data processing apparatus according to the invention. As shown in FIG. 2, a data processing apparatus 109 comprises a CPU core 101 for executing control program, a PROM (non-volatile memory) 102 into which control program and control parameter are memorized, a RAM 103 capable of reading and writing, data transferring means 104 for transferring data from outer terminal to said RAM 103, a register 105 for memorizing such transferred address, and a comparator 106 capable of changing operation/non-operation for comparing a value of the register for an address value outputted from the CPU core 101, that are connected mutually by a data bus 107 and an address bus 108. Furthermore, the data transferring means 104 comprises a serial transfer 112, direct memory access 113 (hereinafter calling as DMA) and a decoder 114.

Figure 3:
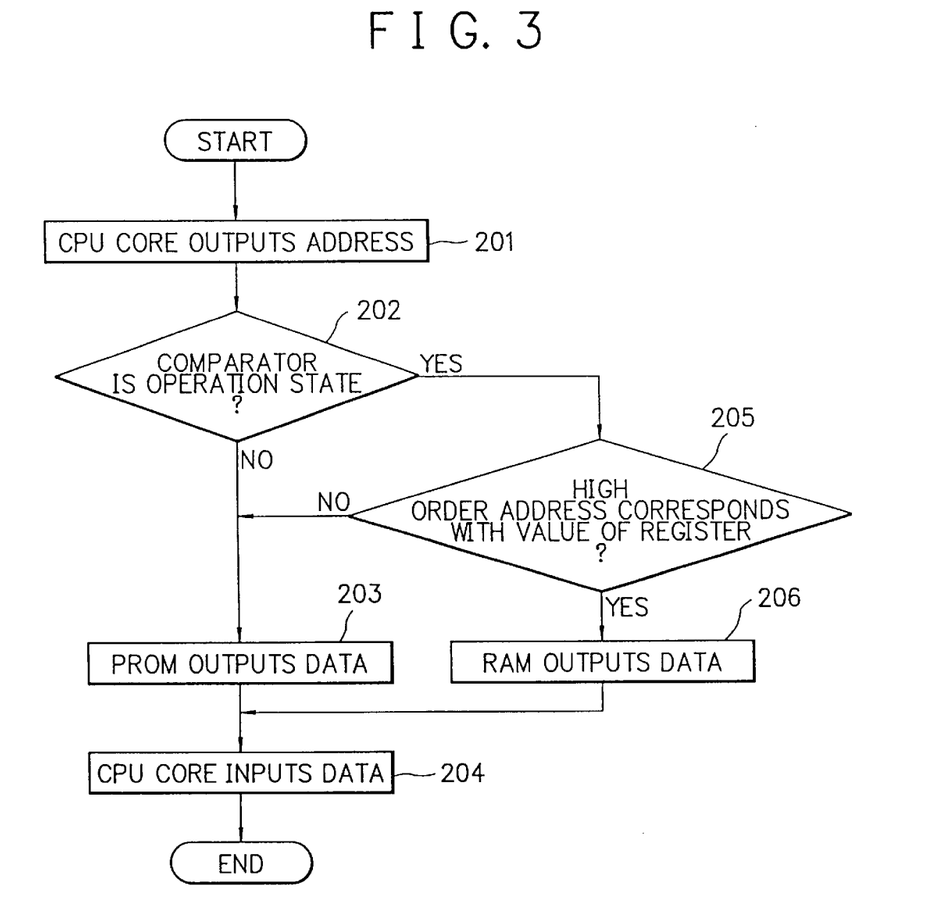
FIG. 3 is a flowchart of repetition flow in the first embodiment of the data processing method according to the present invention.
Figure 4:
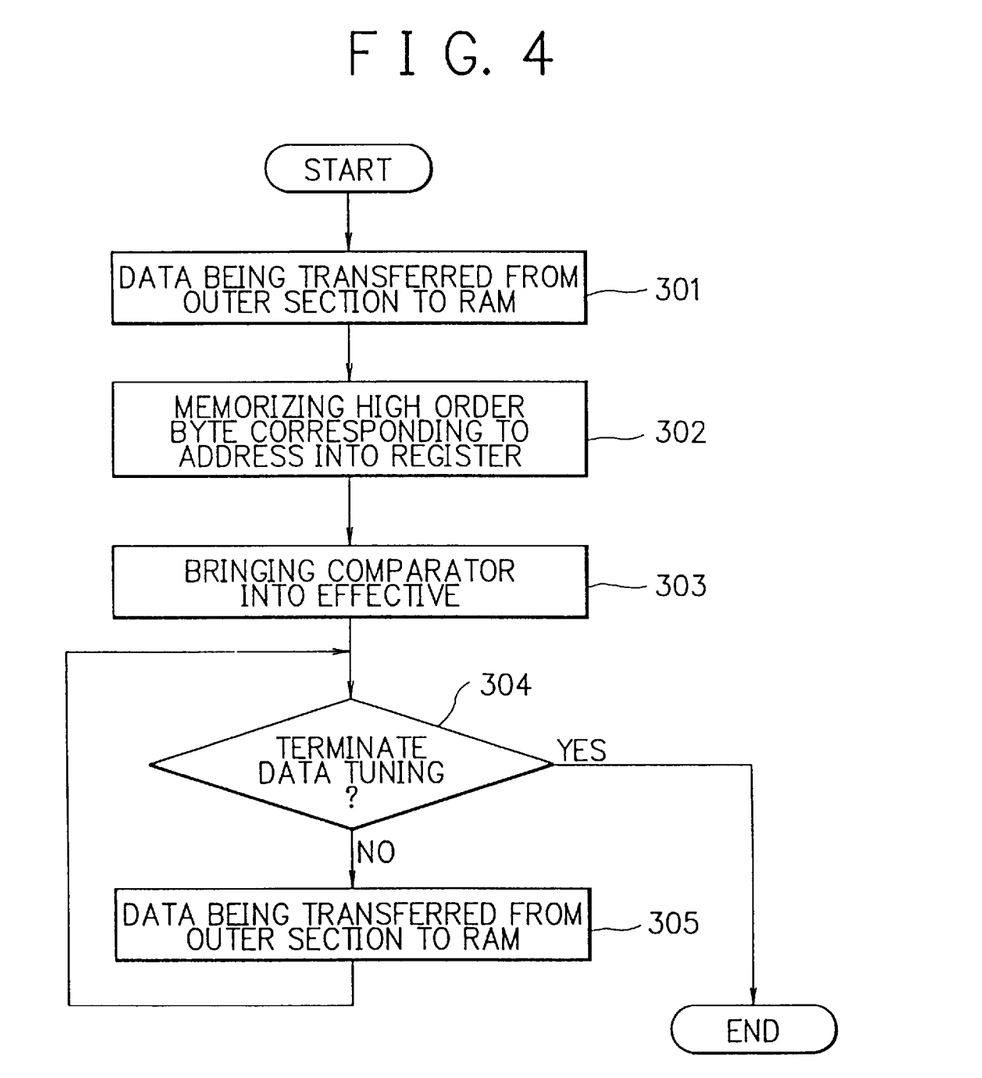
FIG. 4 is a flowchart of the first embodiment of the data processing method according to the present invention.
Figure 5:
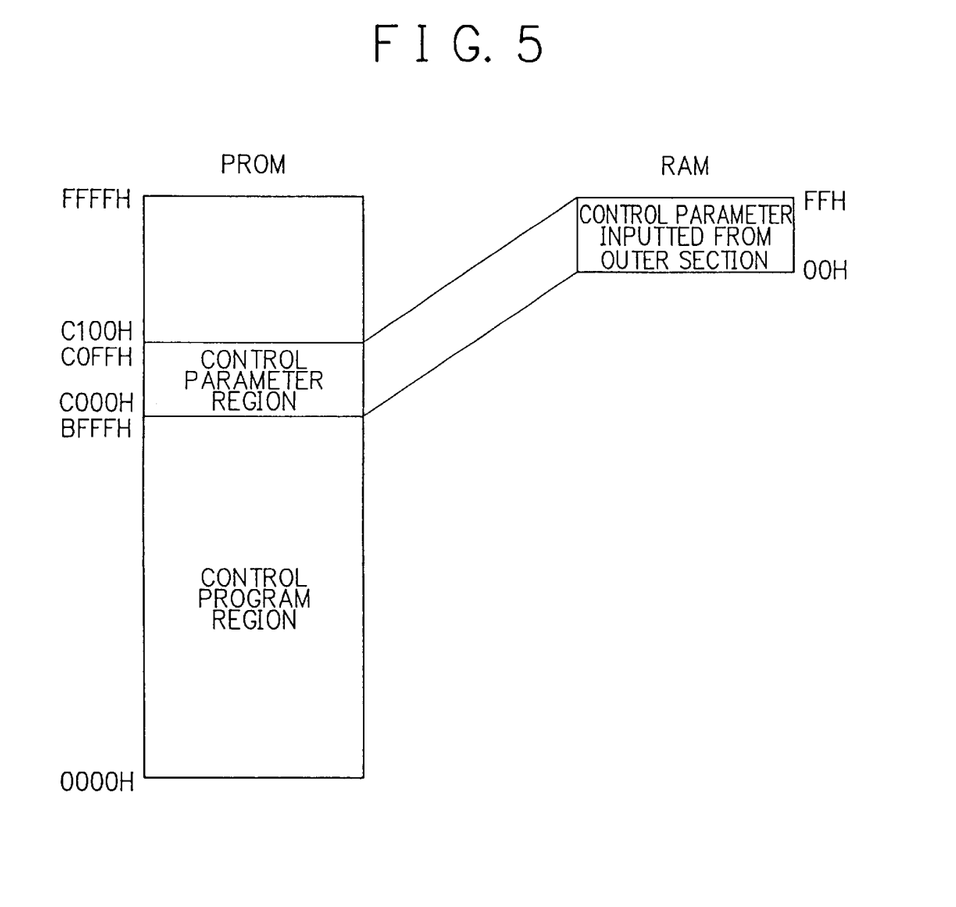
FIG. 5 is a memory map of the data processing apparatus of FIG. 2.
Figure 6:
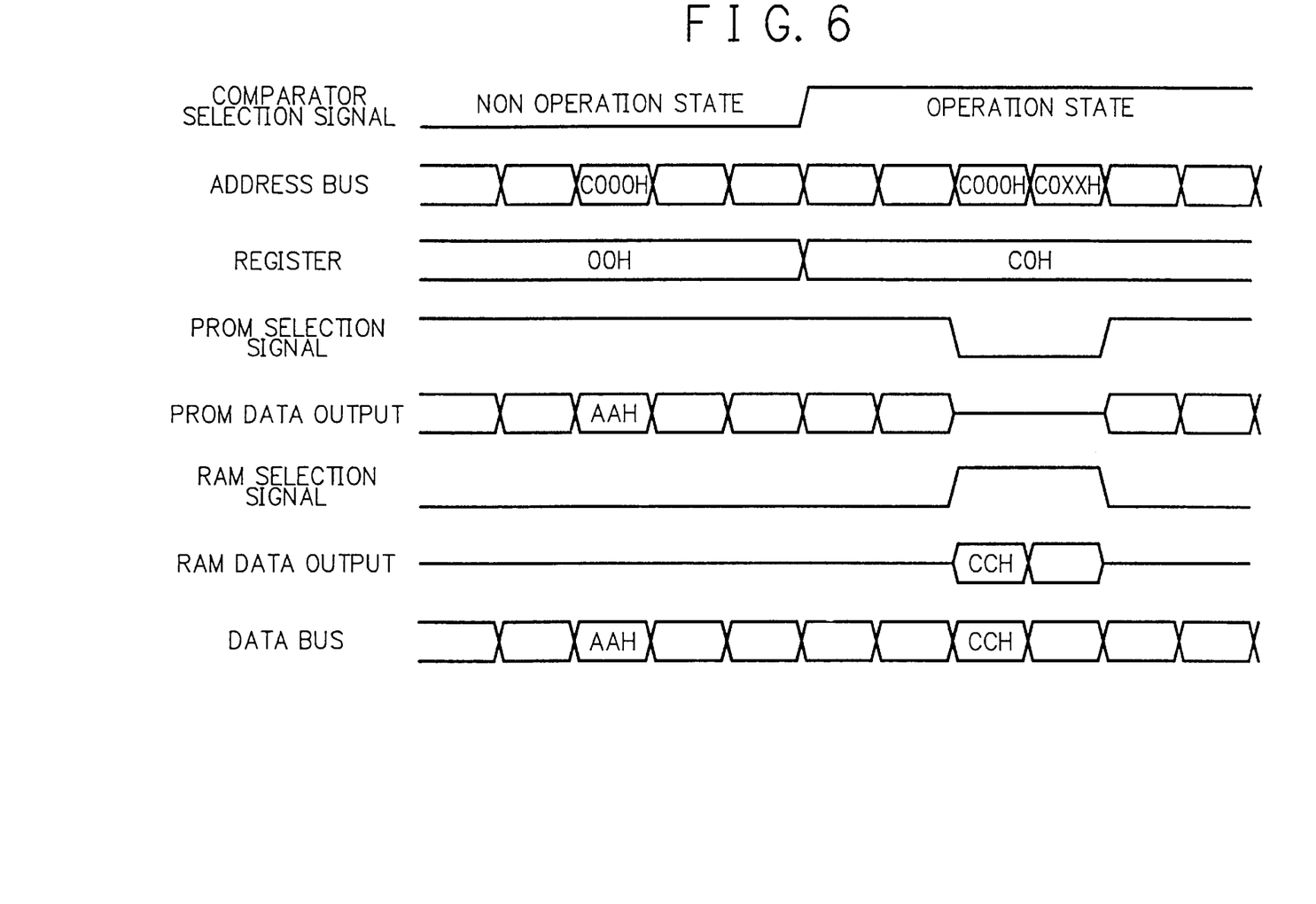
FIG. 6 is a timing chart of the data processing method of the first embodiment.

FIG. 3 is a flowchart of repetition flow in the first embodiment of the data processing method according to the present invention. FIG. 4 is a flowchart of the first embodiment of the data processing method according to the present invention. FIG. 5 is a memory map of the data processing apparatus of FIG. 2. FIG. 6 is a timing chart of the data processing method of the first embodiment.

Operation of the data processing apparatus will be described referring to FIGS. 3, 4, 5, and 6. It is understandable from the memory map of PROM of FIG. 5, normally, the control program and the control parameter are placed on the separated region taken into consideration of maintenance property and operating property. As shown in FIG. 5, it takes address 0000H to BFFFH PROM 104 for control program region, address C000H to C0FFH for control parameter region to be used. The RAM 103 has smaller capacity than the PROM 104. Only address of 00H to FFH is decoded.

Firstly, power supply is applied. The comparator 106 becomes non-operation state. The CPU core 101 outputs an address, executing program while reading data corresponding thereto. FIG. 3 is the flowchart thereof. The CPU core 101 outputs the address to the address bus 108 (STEP 201). Next, since the comparator 106 is of the non-operation state, PROM selection signal 111 comes into active, while RAM selection signal 110 comes into inactive (STEP 202). Consequently, the PROM 102 becomes operation state, thus outputting date stored within the address to the data bus 107 (STEP 203). The RAM 103 becomes non-operation state, and output of the RAM 103 becomes high-impedance. The CPU core 101 reads data on the data bus 107 namely output value of the PROM 102 to execute (STEP 204). The control program stored within the PROM 102 is executed by repeating this operation. When the executed control program employs the control parameter, for example, the CPU core 101 outputs address C000H. Due to non-operation state of the comparator 106, the same operation thereof is performed and AAH is data-outputted from the PROM 102, and the CPU core 101 reads the value thereof to use.

Next, an operation of data-tuning by reading new control parameter from the outside will be described. FIG. 4 is one example of flowchart for performing data-tuning. It inputs data which means writing to the RAM, RAM address and new parameter data to the outer terminal 100. These data are read by the serial transferrer 112, before judging by the decoder 114 that read data are control parameter being read, it permits the comparator to bring non-operation state, thus delivering the RAM address and the new parameter data to the DMA 113. The DMA 113 which receives data requires an employment-right of bus to the CPU core 101. The DMA 113 which receives permission brings the RAM selection signal 110 into effective, and brings the PROM selection signal 111 into ineffective without reference to the comparator 106, thus writing the control parameter to the objective address of the RAM 103.

After writing the data to the DMA 113, the RAM selection signal 110 and the PROM selection signal 111 are restored to its former state, thus transmitting withdrawal of employment-right of bus to the CPU core 101. The DMA 113 instructs the serial transferrer 112 so as to read next data. In virtue of repeating this, the control parameter is written gradually to the RAM 103. At this time, new parameter data corresponding to the address of C000H to C0FFH is written to the RAM-address 00H to FFH whose byte value of low order is put in order (STEP 301). When the required writing is terminated, data meaning termination of writing and high order byte C0H of address on which the control parameter is permutated are inputted to the outer terminal 100. The decoder 114 judges that it is writing termination data. It permits the C0H to memorize to the register 105 (STEP 302), thus bringing the comparator 106 into operating state (STEP 303).

There is explained the case where the control parameter accesses address C000H which is stored under this state using FIG. 3. The CPU core 101 outputs the address C000H (STEP 201). Since the comparator 106 is of operation state, the comparator 106 compares the high order byte of address with the value of register 105 (STEPS 202, 205). After comparison, both are C0H, thereby the comparator 106 brings the RAM selection signal into active, and brings the PROM selection signal 111 into inactive. Consequently, the RAM 103 becomes operation state, the RAM 103 outputs the value which is stored in high order address value 00H for example CCH to the data bus 107 (STEP 206). The CPU core 101 reads this value to use (STEP 204). Consequently, under this condition, the CPU core 101 results in employing of output from the RAM 103 instead of the PROM 104 in terms of region of C000H to C0FFH. Furthermore, in cases where it permits change of control parameter to perform, before proceeding in tuning (STEP 304), by virtue of the same operation as described above, if it permits new control parameter from the outside to read to RAM (STEP 305), it is capable of changing control parameter successively during operation.

Figure 7:
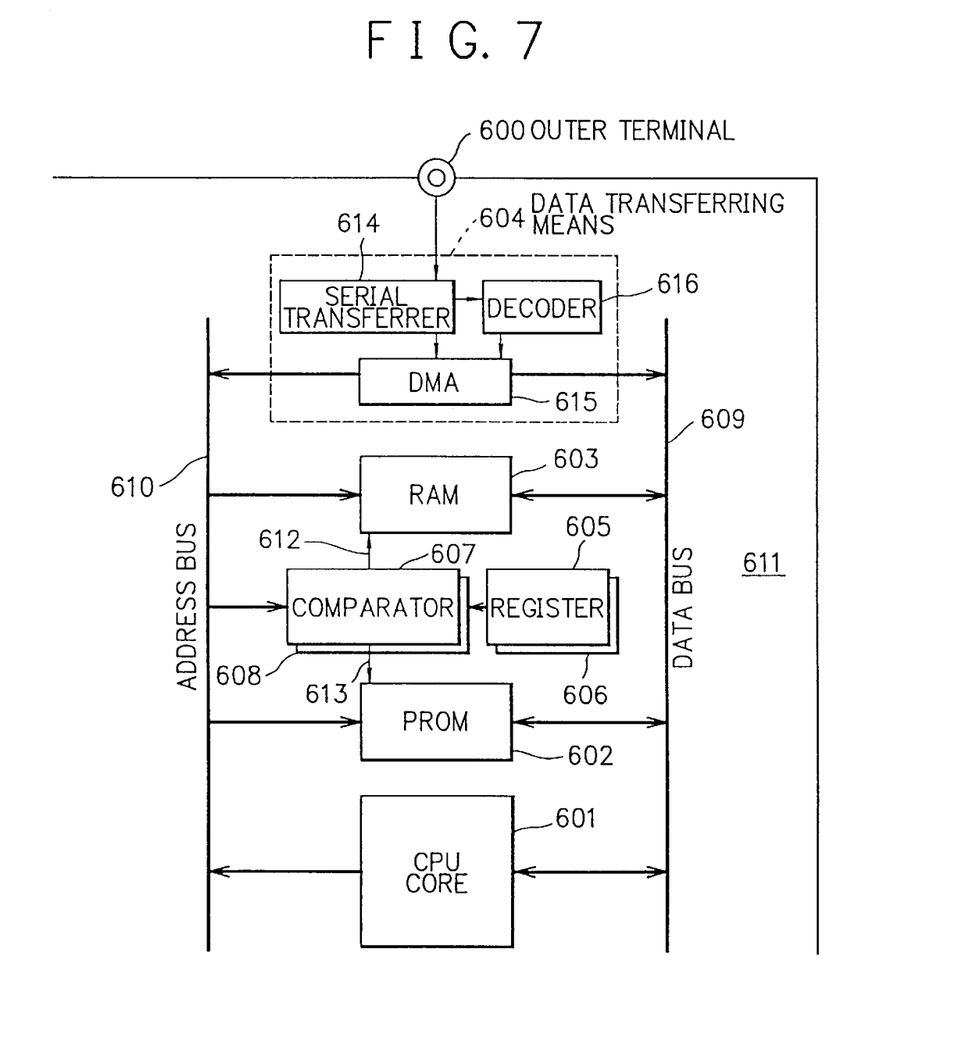
FIG. 7 is a block diagram of a second embodiment of the data processing apparatus according to the present invention.

FIG. 7 shows a data processing apparatus of the second embodiment according to the present invention. As shown in FIG. 7, the data processing apparatus 611 comprises a CPU core 601 for executing a control program, a PROM 602 into which a control program and a control parameter are memorized beforehand, a RAM 603 capable of reading and writing, a data transferring means 604 for transferring data from the outer terminal 600 to the RAM 603, a first and a second registers 605, 606 for memorizing the transferring address, a first comparator 607 capable of exchanging between operation/non-operation for comparing value of the first register 605 with the address value, and a second comparator 608 for comparing value of the second register 606 with the address value, that are connected mutually by data bus 609 and address bus 610. Now, differences between the first embodiment and the second embodiment are that there are two registers for memorizing the transferring address from outer terminal 600, and there are two comparators for comparing the register value and the address value. The data transmission means 604 comprises a serial transmitter 614, a DMA 615, and a decoder 616.

Figure 8:
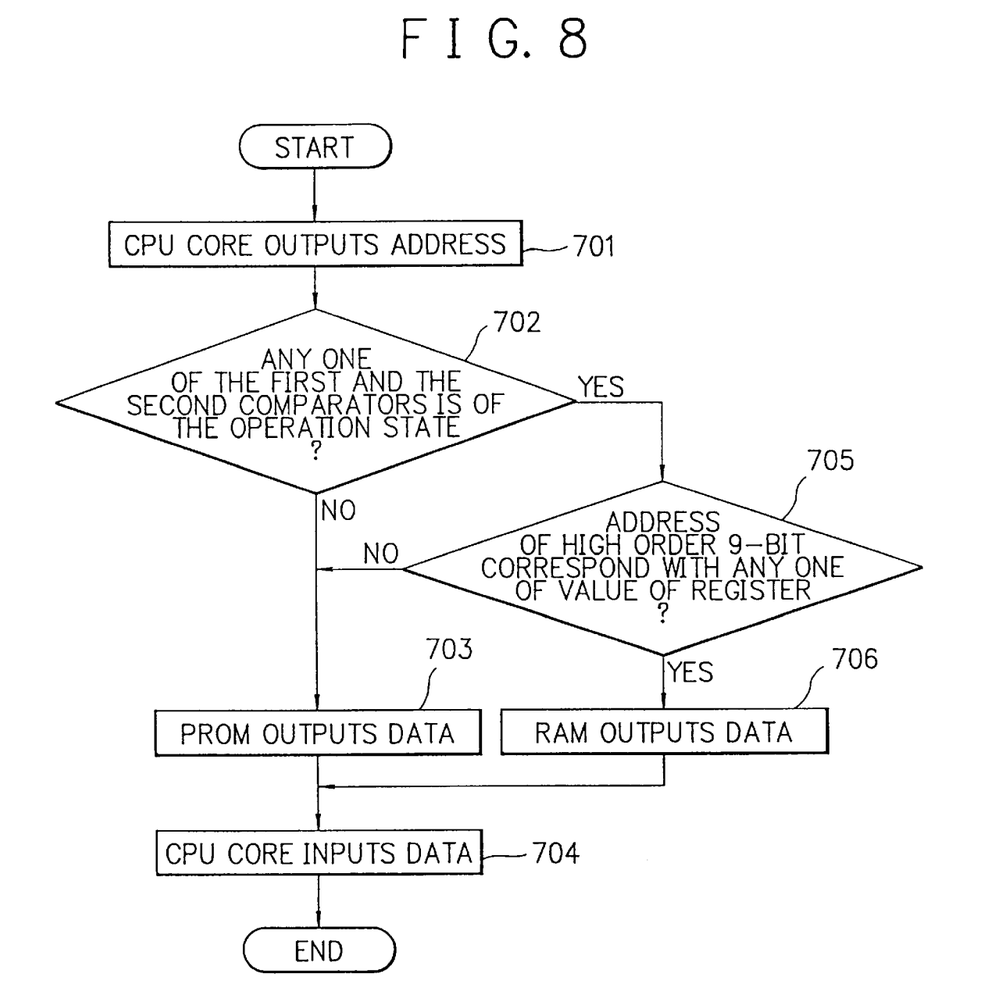
FIG. 8 is a flowchart of repetition flow in the second embodiment of the data processing method according to the present invention.
Figure 9:
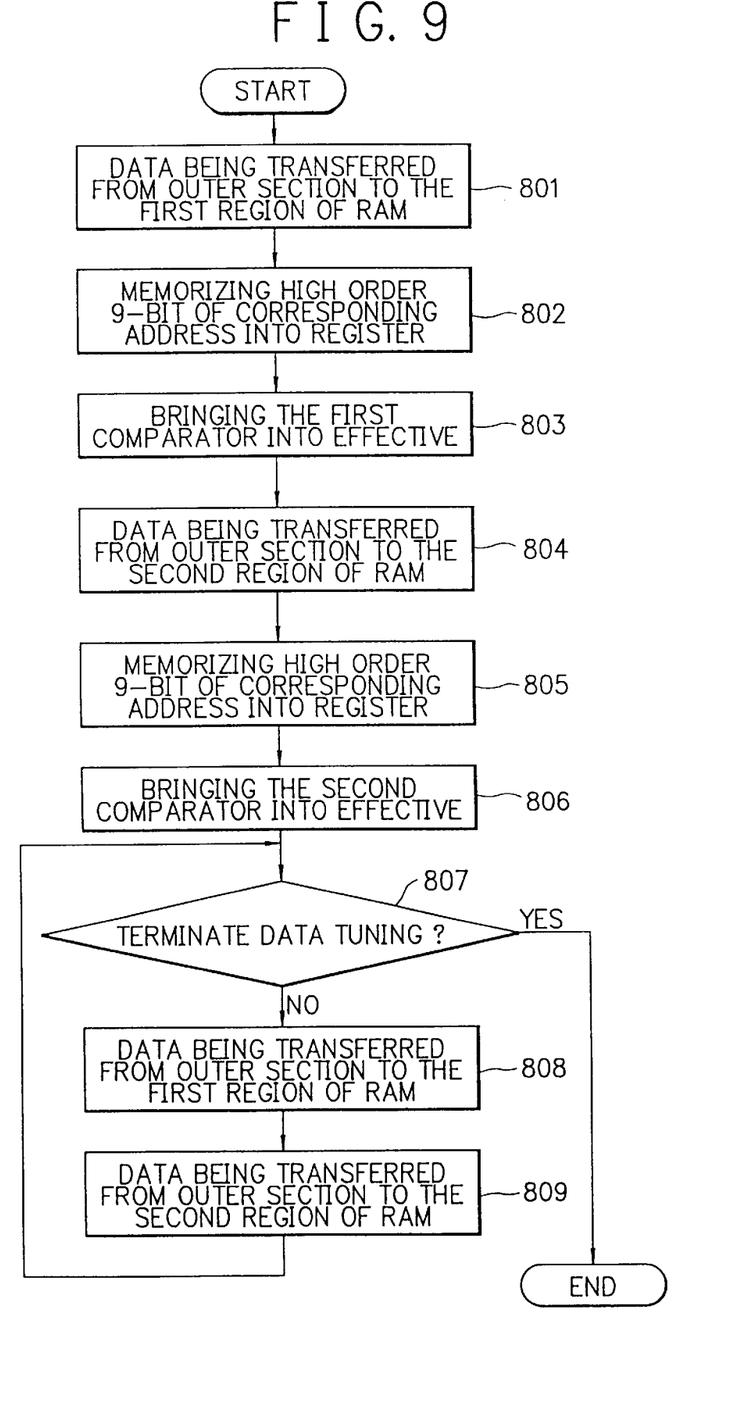
FIG. 9 is a flowchart of the second embodiment of the data processing method according to the present invention.
Figure 10:
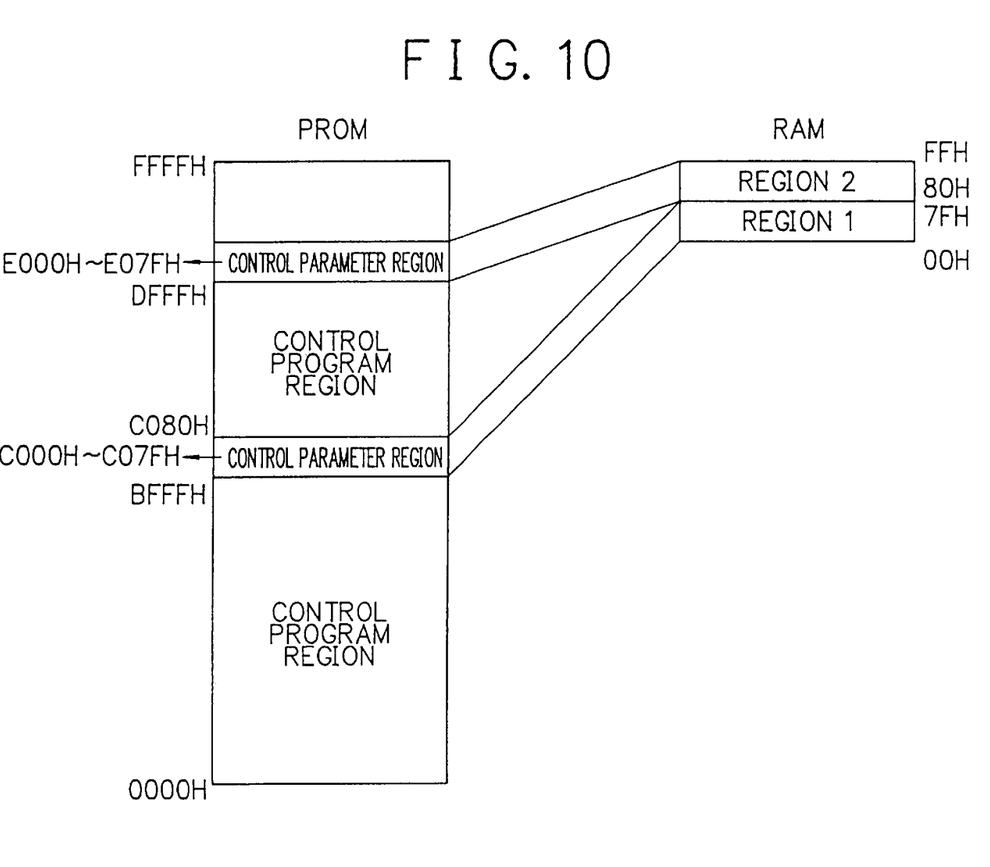
FIG. 10 is a memory map of the data processing apparatus of FIG. 7.
Figure 11:
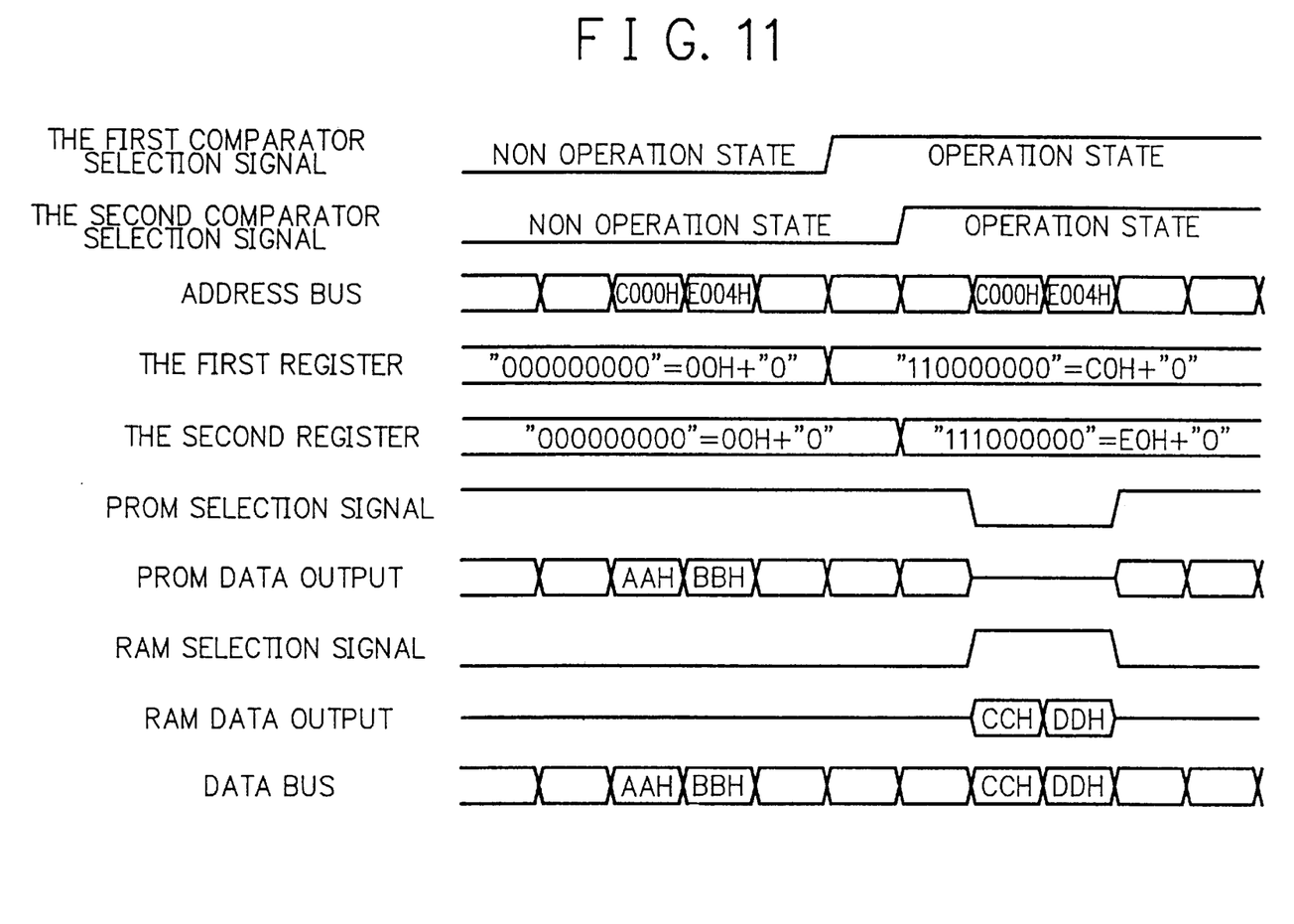
FIG. 11 is a timing chart of the data processing method of the second embodiment.

FIG. 8 is a flowchart of repetition flow in the second embodiment of the data processing method according to the present invention. FIG. 9 is a flowchart of the second embodiment of the data processing method according to the present invention. FIG. 10 is a memory map of the data processing apparatus of FIG. 7. FIG. 11 is a timing chart of the data processing method of the second embodiment.

Operation of the data processing apparatus will be described using FIGS. 8, 9, 10 and 11. As shown in a memory map of the PROM of FIG. 10, also there are cases where it possesses a plurality of control parameter regions. As shown in FIG. 10, it takes address 0000H to BFFFH and C080H to DFFFH of PROM 602 for control program region, address C000H to C07FH and E000H to E07FH for control parameter region to be used. The RAM 603 has smaller capacity than the PROM 602. Only address of 00H to FFH is decoded.

Firstly, power supply is applied. The first comparator 607 and the second comparator 608 become non-operation state. The CPU core 601 outputs an address. Data corresponding thereto is read, before executing the program. FIG. 8 is the flowchart thereof. The CPU core 601 outputs an address to the address bus 610 (STEP 701). Next, since the first comparator 607 and the second comparator 608 are of non-operation state, PROM selection signal 613 comes into active, while RAM selection signal 612 comes into inactive (STEP 702). Consequently, PROM 602 becomes operation state, thus outputting date stored within the address to the data bus 609 (STEP 703). The RAM 603 becomes non-operation state, and output of the RAM 603 becomes high-impedance. The CPU core 601 reads data on the data bus 609, namely output value of the PROM 602 to execute (STEP 704). The control program stored within the PROM 602 is executed by repeating the operation. When the executed control program employs the control parameter, for example, the CPU core 601 outputs the address C000H. Due to non-operation state of the first comparator 607 and the second comparator 608, the same operation thereof is performed and AAH is data-outputted from the PROM 602, and the CPU core 601 reads the value thereof to use.

Next, an operation of data-tuning by reading new control parameter from the outside will be described. FIG. 9 is one example of flowchart performing data-tuning. As shown in FIG. 10, the RAM 603 has separated two regions. For example, it takes 00H to 7FH for the first region, and it takes 80H to FFH for the second region. When it transmits control parameter data corresponding to C000H to C07FH to the first region, it inputs data which means writing to the first region of the RAM 603, RAM address and new parameter data to the outer terminal 600. These data are read by the serial transferrer 614, before judging by the decoder 616 that read data is the first control parameter being read, it permits the first comparator 607 to bring non-operation state, thus delivering the RAM address and the data to the DMA 615. The DMA 615 which receives the data requires an employment-right of bus to the CPU core 601. The DMA 615 which receives permission brings the RAM selection signal 612 into effective, and brings the PROM selection signal 613 into ineffective without reference to the first comparator 607 and the second comparator 608, thus writing the control parameter to the objective address of the RAM 603.

After writing the data to the DMA 615, the DMA 615 transmits withdrawal of employment-right of bus to the CPU core 601. The DMA 615 instructs the serial transmitter 614 so as to read next data.

In virtue of repeating this, the control parameter is written gradually to the first region of the RAM 603. At this time, with respect to new parameter data corresponding to the address of C000H to C0FFH, "O" indicating the first region is placed to eighth-bit, and remaining seven bits are written into the address of 00 to 7FH which are made a pair with the address of PROM (STEP 801). At the time when the required writing is terminated, if it permits data meaning termination of writing and 30 high order 9-bits "110000000" of the address to which the control parameter is permutated to input to the outer terminal 600, the serial transmitter 614 reads thereof. The decoder 614 judges that it is writing data, thus writing "110000000" to the first register 605 (STEP 802). The decoder 616 brings the first comparator 607 into effective (STEP 803).

Next, when it permits the data corresponding to E000H to E07FH to transfer to the second region, it inputs the data meaning writing to the second region of the RAM 603, the RAM address, and new parameter data to the outer terminal 600. These data are read by the serial transferrer 614, before judging by the decoder 616 that read data is the second control parameter being read, it permits the second comparator 608 to bring non-operation state, thus delivering the RAM address and the data to the DMA 615. The DMA 615 which receives the data requires an employment-right of bus to the CPU core 601. The DMA 615 which receives permission brings the RAM selection signal 612 into effective, and brings the PROM selection signal 613 into ineffective without reference to the first comparator 607 and the second comparator 608, thus writing the control parameter to the objective address of the RAM 603.

After writing the data to the DMA 615, the DMA 615 transmits withdrawal of employment-right of bus to the CPU core 601. The DMA 615 instructs the serial transferrer 614 so as to read next data.

In virtue of repeating this, the control parameter is written gradually to the second region of the RAM 603. At this time, with respect to new parameter data corresponding to the address of E000H to E0FFH, "1" indicating the second region is placed to eighth-bit, and remaining seven bits are written into the address of 80 to FFH which are made a pair with the corresponding address (STEP 804). At the time when the required writing is terminated, if it permits data meaning termination of writing and high order 9-bits "110000000" of the address to which the control parameter is permutated to input to the outer terminal 600, the serial transmitter 614 reads thereof. The decoder 614 judges that it is writing termination data, thus writing "110000000"0 to the second register 606 (STEP 805). The decoder 616 brings the second comparator 608 into effective (STEP 806).

A case where the address C000H into which the control parameter is stored is accessed under this condition will be described using FIG. 8. The CPU core 601 outputs the address C000H (STEP 701). Since the first comparator 607 and the second comparator 608 are of the operation state, thus comparing the high order 9-bits of the address with the value of the registers 605 and 606 (STEP 702). Since the high order 9-bits of C000H are "110000000", the high order 9-bits corresponds with the first comparator 605, thus bringing the RAM selection signal 612 into active and bringing the PROM selection signal 613 into inactive (STEP 705). Consequently, the RAM 603 becomes operation state. In the RAM 603, "0000000" of low order of C000H and the address of 00H whose "0" of eighth bit representing the first region are selected. For example, the RAM 603 outputs CCH to the data bus 609 (STEP 706). The CPU core 601 reads this value to use (STEP 704). Consequently, under this state, the CPU core 601 results in employment of output of the RAM 603 instead of the PROM 602 in terms of the region of C000H to C07FH.

Also a case where the address E004H into which the control parameter is stored will be described. The CPU core 601 outputs the address E004H (STEP 701). The first comparator 607 and the second comparator 608 are of the operation state, thus comparing the high order of 9-bits of address with values of registers 605 and 606 (STEP 702). Since the high order 9-bits of E004H are "111000000", the high order 9-bits corresponds with the second comparator 606, thus bringing the RAM selection signal 612 into active and bringing the PROM selection signal 613 into inactive (STEP 705). Consequently, the RAM 603 becomes operation state. In the RAM 603, "0000100" of low order of seventh-bit of E004H and the address of 00H whose "1" of eighth-bit representing the second region are selected (STEP 706). The CPU core 601 reads this value to use (STEP 704). Consequently, under this state, the CPU core 601 results in employment of output of the RAM 603 instead of the PROM 602 in terms of the region of E000H to E07FH. When it permits tuning to continue while performing change of the control parameter (STEP 807), reading new control parameter from outer side to the RAM by the same operation as described above (STEPS 808, 809), it is capable of changing control parameter successively during operation. Thus, by virtue of increasing the register memorizing address and the comparator, it is capable of coping with the case where a plurality of data regions exist.

As described above according to the present invention, when data storing address is outputted while rewriting the RAM during execution of the CPU core, the CPU core executes the program operation with the data stored within the RAM referred, instead of the data stored within the non-volatile memory, it become capable of changing parameter data with operation of the CPU core executed. For this reason, in the data processing method and apparatus according to the invention, rapid tuning is capable without disconnection of the operation power source or disconnection of the computer system, it becomes applicable to the engine controlling and so forth. In this case, since there is no change in address which accesses from the control program, it is not required to rewrite the control program which already exists. It is capable of employing the control program effectively, thus becoming effective in that the resources are re-used.

While preferred embodiments of the invention have been described using specific terms, such description is for illustrative purpose only, and it is to be understood that changes and variations may be made without departing from the spirit or scope of the following claims.

What is claimed is:

1. A data processing apparatus comprising:
    a CPU core for excuting a program operation for the purpose of implementing data processing;
    a non-volatile memory storing data referred to at the time of data processing;
    a RAM for storing tuning data in a first memory region;
    a first register for storing a first data-stored-address; and
    a first comparator for making a comparison between a high order portion of an address received from said CPU core and said first data-stored-address,
    wherein said CPU core is provided with data stored within said first memory region of said RAM instead of data stored within said non-volatile memory whenever said first comparator indicates a correspondence between said high order portion of said address received from said CPU and said first data-stored-address, and said CPU core is not provided with data stored within said first memory region of said RAM whenever said first comparator indicates no correspondence; and
    wherein;
    said first comparator is brought into an effective state after said tuning data is stored in said RAM and after said data-stored-address is stored in said first register, and
    said first comparator remains in said effective state when said CPU core is provided with said data stored in said RAM.

2. A data processing apparatus according to claim 1, further comprising:
    a second memory region in said RAM,
    a second register for storing a second data-stored-address, and
    a second comparator;

said first register and said first comparator corresponding to said first memory region;

said second register and said second comparator corresponding to said second memory region;

wherein said CPU core is provided with data stored within said second memory region of said RAM instead of data stored within said non-volatile memory when said second comparator indicates a correspondence between said high order portion of said address received from said CPU and said second data-stored-address, and said CPU core is not provided with data stored within said second memory region of said RAM when said second comparator indicates no correspondence; and said second comparator is brought into said effective state after said tuning data is stored in said second memory region of said RAM and after said data-stored-address is stored in said second register.

3. A data processing method, comprising:

providing a CPU core for executing a program operation;

storing data In a non-volatile memory;

storing in a RAM data for tuning; and then loading into a register a data-stored-address; and then changing a state of a comparator from a non-operation state to an operation state;

whenever said comparator is in said operation state, making comparisons between said data-stored-address and each address received from said CPU core; and only when said comparison indicates a correspondence between a high order portion of said data-stored-address and said address received from said CPU core, referring to the data stored within said RAM instead of the data stored within said non-volatile memory;

said first comparator remains in said operation state when said CPU core is provided with said data stored in said RAM.

4. A data processing method according to claim 3, further comprising:

establishing in said RAM a second memory region;

providing a second register and a second comparator corresponding to said second memory region;

when said second comparator is in said operation state, making a respective comparison between a respective data-stored-address in said second register with said address received from said CPU core; and when said respective comparison indicates a correspondence between said respective data-stored-address in said second register and said address received from said CPU core, executing said program by referring to the data stored within said second memory region of said RAM.

* * * * *